United States Patent [19]

Seibig

[11] Patent Number: 5,174,660
[45] Date of Patent: Dec. 29, 1992

[54] SHAPED PART COMPRISING A METALLIC MEMBER AND A CERAMIC MEMBER

[75] Inventor: Bernd Seibig, Geesthacht, Fed. Rep. of Germany

[73] Assignee: D.O.R.N.E.Y Technologie GmbH, Lübeck, Fed. Rep. of Germany

[21] Appl. No.: 777,703

[22] Filed: Oct. 16, 1991

[30] Foreign Application Priority Data

Oct. 16, 1990 [DE] Fed. Rep. of Germany ....... 4032803

[51] Int. Cl.⁵ ............................................. F16C 17/04
[52] U.S. Cl. ................................ 384/420; 384/907.1; 384/913
[58] Field of Search ............... 384/420, 424, 425, 913, 384/907.1, 275, 492

[56] References Cited

U.S. PATENT DOCUMENTS

| | | | |
|---|---|---|---|
| 4,759,644 | 7/1988 | Mizukusa et al. | 384/913 |
| 5,054,940 | 10/1991 | Momose et al. | 384/907.1 |
| 5,094,550 | 3/1992 | Momose et al. | 384/420 |

FOREIGN PATENT DOCUMENTS 137621 8/1983 Japan .................. 384/492

Primary Examiner—Lenard A. Footland
Attorney, Agent, or Firm—Robert W. Becker & Associates

[57] ABSTRACT

A shaped part having members that are positively interconnected via thermal treatment. The shaped part includes a metallic member having a first flange that is delimited by an outer contour of the metallic member and projects essentially at right angles therefrom. The first flange defines a recess-like opening having a base in which is provided a circumferential groove that extends essentially parallel to the first flange. A second flange is formed between a base of the groove and a contiguous surface of the metallic member. The shaped part also includes a ceramic member that is received in the recess-like opening. Prior to creation of the positive interconnection between the metallic member and the ceramic member, at least the metallic member is heated up.

7 Claims, 1 Drawing Sheet

SHAPED PART COMPRISING A METALLIC MEMBER AND A CERAMIC MEMBER

BACKGROUND OF THE INVENTION

The present invention relates to a shaped part, especially for use as a sliding or journal bearing that can be axially stressed, with the shaped part including a metallic member and a ceramic member that are positively interconnected via thermal treatment.

Adjoined together shaped parts of this type have been known for a long time and are required in many technical fields, in order, for example, to be able to be used as sliding or journal bearings that can be axially stressed where high process temperatures occur. Typical applications include, for example, pumps or mixers in so-called bioreactors, or pumps in the chemical industry that must operate without leaking at high process temperatures and high temperature gradients. In order to be able to positively or frictionally connect the metallic member with the ceramic member, the two members are first thermally treated, whereby the ceramic member is then generally in the thermally treated state inserted into a corresponding recess opening formed in the metallic member. The two joined-together members are subsequently subjected to a cooling process, whereby the members contract by a predetermined amount so that consequently the metallic member encloses the ceramic member in a positive manner below a prescribed cooling temperature.

However, it is has been shown that as a consequence of high process temperatures at which such members serve, for example, as bearings, the heretofore known bearings can sometimes briefly enter the temperature range in which the positive connection of the two members was effected. The result is a loosening or canceling of the positive connection with a devastating result for the bearing, the consequence generally being a total destruction of the bearing. This serious problem has been attempted to be resolved by providing the ceramic member that is accommodated in the metallic member with mechanical means, for example pins, rings, and/or abutment means in the form of projections or recesses that are formed on the outer contour of the ceramic member and engage in corresponding recesses and projections formed in the metallic member. However, the result of all these measures was that the ceramic member, due to the pressure stresses that inherently acted thereupon in an irregular manner, was increasingly susceptible to a total destruction as a consequence of certain parts failing or breaking off, so that this approach did not provide any significant success.

It is therefore an object of the present invention to provide a shaped part of the aforementioned general type that is sufficiently resistant to high process temperatures, easily maintains its positive connection over a wide temperature range from room temperature to at least 350° C. without any limitation of its function, that its function is similarly maintained at the great temperature gradients that occur in this temperature range, that it can be easily and economically produced, and that no additional measures are required for creating a positive connection between the metallic member and the ceramic member.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
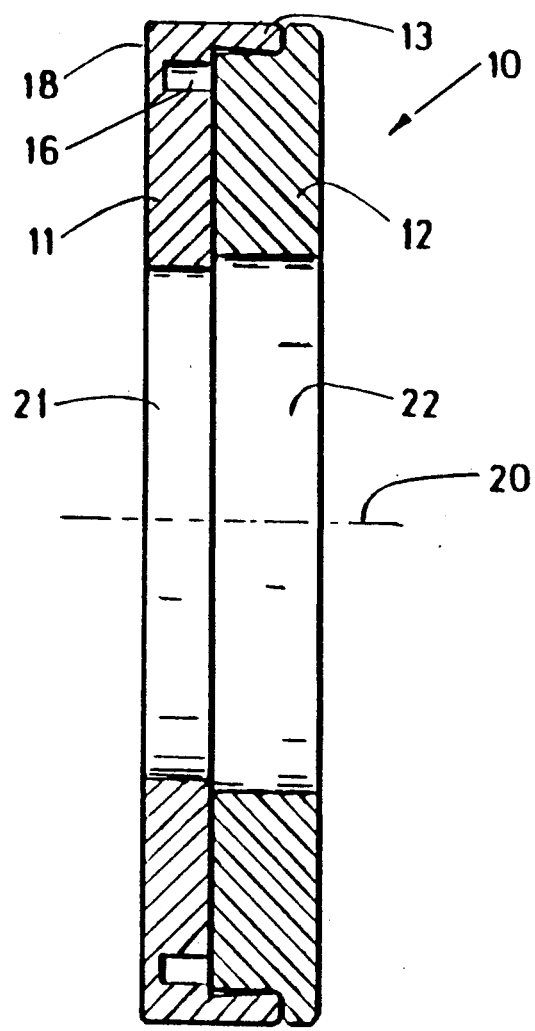
FIG. 1 is a cross-sectional side view of one exemplary embodiment of an inventive shaped part that comprises a ceramic member and a metallic member, with the members being shown in a positively connected state.

The shaped part of the present invention is characterized primarily by: A metallic member having a first flange that is delimited by the outer contour of the metallic member and projects essentially at right angles therefrom, with the first flange defining a recess-like opening having a base in which is provided a circumferential groove that extends essentially parallel to the first flange, with a second flange being formed between the base of the groove and a contiguous surface of the metallic member; and a ceramic member that is received in the recess-like opening, whereby prior to creation of the positive interconnection between the metallic member and the ceramic member, at least the metallic member is heated up.

The important advantage of the present invention is that a permanent, temperature-resistant connection is provided between members that have different thermal expansions, whereby via suitable selection of the depth of the groove and of the width of the second flange, the forward first flange for receiving the ceramic member remains resilient in a predeterminable manner over the entire operating temperature range of the shaped part.

Pursuant to one advantageous specific embodiment of the present invention, the angle between the base of the recess-like opening and the adjacent first flange is less than 90°. The advantage of this is that due to this predeterminable angle, the inside diameter or opening width of the metallic member is less than the corresponding dimension of the ceramic member that is to be inserted or accommodated in this opening. However, by thermally treating at least the metallic member, when the rated connection temperature is achieved, the inside width of the recess-like opening is large enough that the ceramic member can be inserted into this opening.

It is shown to be advantageous to provide an angle of approximately 87° for certain applications.

In principle, the shaped part can have any desired and suitable configuration, which applies equally to the metallic and the ceramic member. For example, the metallic and ceramic members can have an outer contour that is angular, irregular, or regular, as desired. The inventive principle, while taking into consideration the requirements outlined in the object of the invention, functions equally well for all shapes of the members and the overall shaped part formed therefrom. However, it has been shown to be advantageous for both members to be rotationally symmetrical relative to an axis of the members, with such an embodiment generally being selected for the aforementioned sliding or journal bearings that can be axially stressed. Thus, each member has an essentially cylindrical configuration.

As already indicated in conjunction with the slightly tapered first flange, prior to the connection with the ceramic member the opening of the metallic member is advantageously smaller than the correspondingly embodied portion of the ceramic member that is to be inserted into the opening.

Pursuant to a further advantageous specific embodiment of the inventive shaped part, to create the positive or frictional connection, prior to introduction of the ceramic member into the recess-like opening, the metallic member is heated to at least 550° C., which results in sufficient expansion of the metallic member so that the non-heated up ceramic member can be inserted into the opening without difficulty.

It is advantageously also possible for the creation of the positive connection to heat up not only the metallic member but also the ceramic member to at least 600° C. prior to introduction of the ceramic member into the opening, so that again the opening is adequately expanded and the heated-up ceramic member can be inserted into the recess-like opening of the heated-up metallic member.

Further specific features of the present invention will be described in detail subsequently.

DESCRIPTION OF PREFERRED EMBODIMENTS

Referring now to the drawing in detail, the shaped part 10 illustrated in FIG. 1 comprises two essentially rotationally symmetrical, essentially cylindrical metallic and ceramic members 11, 12 respectively. Both the metallic member 11 as well as the ceramic member 12 has a respective hole or opening 21, 22 that extends axially relative to the axis 20 of the member and serves to receive, for example, non-illustrated shafts or bearings. The metallic member 11 has a first flange 13 that is delimited by the outer contour of the metallic member. This first flange 13 projects at essentially right angles from the member 11, thereby forming a recess-like opening 14 (see FIG. 3). The base 15 of the opening 14 forms a plane that is perpendicular to the axis 20 of the member. Formed in the base 15 of the opening 14 is a circumferential groove 16 that extends essentially parallel to the first flange 13. The groove 16 has an essentially rectangular cross-sectional configuration. The base 17 of the groove 16, and that surface 18 of the metallic member 11 that is contiguous to the base 17 of the groove 16, form a second flange 19. As was the case with the base 15, the surface 18 is in the form of a planar surface that is also perpendicular to the axis 20 of the member.

Figure 2:
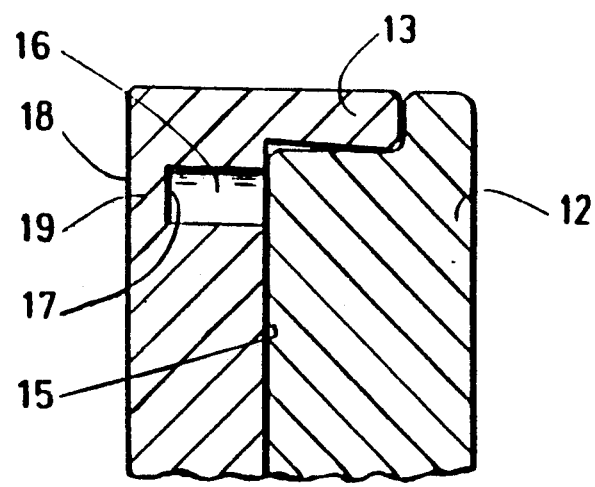
FIG. 2 is an enlarged cross-sectional view of a portion of the shaped part of FIG. 1.
Figure 3:
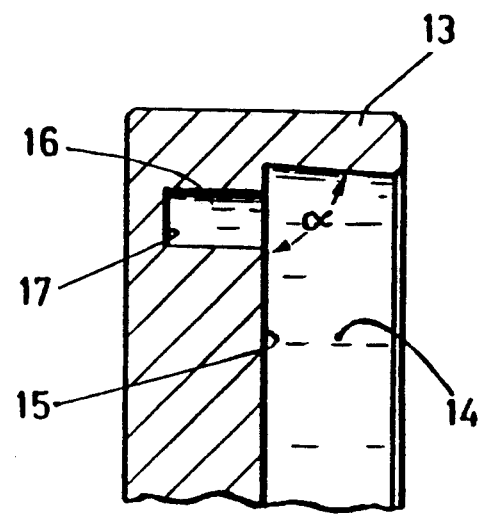
FIG. 3 is an enlarged cross-sectional view of a portion of the shaped part of FIG. 1, with the ceramic member having been removed from the recess-like opening of the metallic member.

As can be clearly seen from FIGS. 2 and 3, the angle α between the base 15 of the opening 14 and the adjacent flange 13 is less than 90°, and in the illustrated embodiment is 87°. The groove 16 is slightly offset in a direction toward the axis 20 of the member relative to that delimiting wall of the opening 14 that is formed by the first flange 13.

The in this case circular opening 14 has an inside diameter or opening width that is less than the diameter of the ceramic member 12 that is to be inserted into the recess-like opening 14 when, prior to a frictional connection of the two members 11, 12, these members are at room temperature.

It is possible to interconnect the two members 11, 12 in various ways to provide a positive or frictional connection therebetween. For example, this can be accomplished in that to provide the frictional connection, merely the metallic member 11 is heated to at least 500° C. prior to introduction of the ceramic member 12 into the opening 14. On the other hand, it would also be possible to heat both the metallic member 11 as well as the ceramic member 12 to at least 600° C. prior to introduction of the ceramic member 12 into the opening 14.

Two examples follow, with the metallic member 11 comprising, for example, the material 1,4571, and having the following dimensions:

| | |
|---|---|
| Outer diameter | 70 mm |
| Width | 9.8 mm |
| Groove depth | 3.5 mm |
| Flange | 1.4 mm |
| Recess depth | 4.9 mm |
| Angle | 3° |

The ceramic member comprises, for example, SiSiC, SiC, $Al_2O_3$, or other compounds, with the outer diameter being slightly less than that of the metallic member 11.

Method 1

Operating temperature 350° C.
Heating temperature 600° C.–650° C.

A positive connection is achieved between the temperatures of 650° C. and 350° C. if the ceramic member and the metallic member are to be heated. In this connection, a play between 50–100μ results for the joining together of the two members. The members, which have been heated together, connect to one another and are fixedly interconnected after they have been cooled to the temperature range of 20° C.–350° C.

Method 2

Operating temperature 350° C.
Heating temperature 550° C.

The ceramic member remains cold while the metallic member is heated to 550° C. At this temperature, the cold ceramic member is introduced. The greatest play during this process is 140μ. During the subsequent contraction process, a fixed connection is similarly obtained over an operating range of 20° C. to 350° C.

The present invention is, of course, in no way restricted to the specific disclosure of the specification and drawing, but also encompasses any modifications within the scope of the appended claims.

What I claim is:

1. A shaped part having members that are positively interconnected via thermal treatment, said shaped part comprising:

a metallic member having a first flange that is delimited by an outer contour of said metallic member and projects essentially at right angles therefrom, with said first flange defining a recess-like opening having a base in which is provided a circumferential groove that extends essentially parallel to said first flange, with a second flange being formed between a base of said groove and a contiguous surface of said metallic member; and a ceramic member that is received in said recess-like opening of said metallic member, whereby prior to creation of said positive interconnection between said metallic member and said ceramic member, at least said metallic member is heated up.

2. A shaped part according to claim 1, in which said first flange extends at an angle of less than 90° relative to said base of said recess-like opening of said metallic member.

3. A shaped part according to claim 2, in which said angle is 87°.

4. A shaped part according to claim 1, in which both said metallic member and said ceramic member are rotationally symmetrical relative to a respective axis of said member.

5. A shaped part according to claim 1, in which prior to creation of said positive interconnection between said metallic member and said ceramic member, said recess-like opening of said metallic member is smaller than a correspondingly embodied portion of said ceramic member that is to be received therein.

6. A shaped part according to claim 1, in which to create said positive interconnection between said metallic member and said ceramic member, prior to introduction of said ceramic member into said recess-like opening of said metallic member, said metallic member is heated to at least 550° C.

7. A shaped part according to claim 1, in which to create said positive interconnection between said metallic member and said ceramic member, prior to introduction of said ceramic member into said recess-like opening of said metallic member, both said metallic member as well as said ceramic member are heated to at least 600° C.

* * * * *